(12) United States Patent
Bhuiya et al.

(10) Patent No.: US 10,438,306 B2
(45) Date of Patent: Oct. 8, 2019

(54) DYNAMIC STATUS UPDATE FOR OFFLINE USER

(71) Applicant: International Business Machines Corporation, Armonk, NY (US)

(72) Inventors: Subhajit Bhuiya, Bangalore (IN); Vijay Ekambaram, Chennai (IN); Ashish Kumar Mathur, Bangalore (IN); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 298 days.

(21) Appl. No.: 15/230,089

(22) Filed: Aug. 5, 2016

(65) Prior Publication Data

US 2018/0040081 A1 Feb. 8, 2018

(51) Int. Cl.
*G06Q 10/00* (2012.01)
*G06Q 50/14* (2012.01)
(Continued)

(52) U.S. Cl.
CPC .......... *G06Q 50/14* (2013.01); *G06N 5/04* (2013.01); *G06N 7/005* (2013.01);
(Continued)

(58) Field of Classification Search
CPC .......... G06Q 50/01; G06Q 50/14; G06Q 10/063114; G06Q 10/109; G06Q 10/1095
(Continued)

(56) References Cited

U.S. PATENT DOCUMENTS 9,292,829 B2    3/2016  Balannik et al.
2006/0085131 A1*  4/2006  Yopp ............... B60W 30/085
                                                       701/301
(Continued)

FOREIGN PATENT DOCUMENTS

WO    WO2014178073 A3    11/2014

OTHER PUBLICATIONS

SOMEECARDS, "Sometimes we just don't know what status to post on Facebook. This will fix that forever.", 5 pages, available at: http://www.someecards.com/news/so-that-happened/what-would-i-say-auto-generates-your-facebook-status-based-on-your-facebook-history/, Accessed on Jun. 9, 2016.

(Continued)

*Primary Examiner* — Gabrielle A McCormick
(74) *Attorney, Agent, or Firm* — Ference & Associates LLC

(57) ABSTRACT

One embodiment provides a method including: utilizing at least one processor to execute computer code that performs the steps of: obtaining a user's status update posted on a social networking site; analyzing the status update to obtain at least one element of travel information of a travel plan included within the status update, wherein the travel information comprises the elements of: a starting location, an ending location, and a mode of transportation; predicting elements missing from the travel information, the missing elements comprising travel information not included in the status update, wherein the predicting comprises analyzing a secondary information source for the missing elements and wherein the predicting comprises assigning a confidence score to the prediction; and providing a dynamic travel update identifying travel progress of the user, compared to the travel plan based upon the obtained at least one element and the predicted missing elements, wherein the dynamic (Continued)

travel update comprises the obtained at least one element and a predicted missing element having a highest confidence score. Other aspects are described and claimed.

20 Claims, 4 Drawing Sheets

(51) Int. Cl.
*G06Q 50/00* (2012.01)
*G06N 7/00* (2006.01)
*G06N 5/04* (2006.01)
*G06Q 10/10* (2012.01)
*G06Q 10/06* (2012.01)

(52) U.S. Cl.
CPC ... *G06Q 10/063114* (2013.01); *G06Q 10/109* (2013.01); *G06Q 10/1095* (2013.01); *G06Q 50/01* (2013.01)

(58) Field of Classification Search
USPC .......................................................... 705/319
See application file for complete search history.

(56) References Cited

U.S. PATENT DOCUMENTS

| | | | | |
|---|---|---|---|---|
| 2007/0185744 A1* | 8/2007 | Robertson | .............. | G06Q 10/02 705/5 |
| 2009/0157312 A1* | 6/2009 | Black | .................... | G01C 21/30 701/414 |
| 2009/0282342 A1* | 11/2009 | Fabris | .................... | G06Q 10/02 715/733 |
| 2011/0184886 A1* | 7/2011 | Shoham | ................. | G06Q 30/02 705/400 |
| 2012/0144468 A1* | 6/2012 | Pratt | ....................... | G06F 21/40 726/7 |
| 2012/0158843 A1* | 6/2012 | Angani | .................. | G06Q 30/02 709/204 |
| 2012/0265433 A1* | 10/2012 | Viola | ................. | G01C 21/3617 701/410 |
| 2013/0103300 A1* | 4/2013 | Rakthanmanon | .. | G01C 21/3484 701/408 |
| 2013/0344896 A1* | 12/2013 | Kirmse | .............. | G06F 17/3087 455/456.3 |
| 2014/0088864 A1* | 3/2014 | Lamarca | ................ | G01C 21/34 701/465 |
| 2014/0095066 A1* | 4/2014 | Bouillet | ............... | G08G 1/0104 701/465 |
| 2014/0343841 A1* | 11/2014 | Faaborg | ............. | G01C 21/3438 701/465 |
| 2014/0372154 A1 | 12/2014 | Scott | | |
| 2015/0168150 A1* | 6/2015 | Kahn | ...................... | H04W 4/21 701/408 |
| 2015/0292894 A1* | 10/2015 | Goddard | ............ | G01C 21/3453 701/400 |
| 2016/0345132 A1* | 11/2016 | Creighton | ............. | H04W 4/029 |
| 2017/0116552 A1* | 4/2017 | Deodhar | .......... | G06Q 10/06316 |

OTHER PUBLICATIONS

Jibing Gong et al., "ACTPred: Activity Prediction in Mobile Social Networks", Tsinghua Science and Technology, ISSN 1007-0214 May 2011, Jun. 2014, 10 pages, vol. 19, No. 3, available at: http://ieeexplore.ieee.org/stamp/stamp.jsp?arnumber=6838197, IEEE Digital Library.

* cited by examiner

DYNAMIC STATUS UPDATE FOR OFFLINE USER

BACKGROUND

Many users are connected to social networking sites. These sites allow users to stay connected to and communicate with other users. For example, users can communicate directly with other users using the social networking site's messaging capabilities. As another example, users can provide status updates which other users can access and read. Some of the status updates may be related to static events, which may include events related to a one-time action of the user or an action having a single step. For example, the status update may be related to a relationship status change, job status change, or the like. Other status updates may be related to dynamic events, which may include events related to an action that has multiple steps or takes time. For example, the status update may be related to the user traveling from one location to another, the user attending an event, or the like.

BRIEF SUMMARY

In summary, one aspect of the invention provides a method, comprising: utilizing at least one processor to execute computer code that performs the steps of: obtaining a user's status update posted on a social networking site; analyzing the status update to obtain at least one element of travel information of a travel plan included within the status update, wherein the travel information comprises the elements of: a starting location, an ending location, and a mode of transportation; predicting elements missing from the travel information, the missing elements comprising travel information not included in the status update, wherein the predicting comprises analyzing a secondary information source for the missing elements and wherein the predicting comprises assigning a confidence score to the prediction; and providing a dynamic travel update identifying travel progress of the user, compared to the travel plan based upon the obtained at least one element and the predicted missing elements, wherein the dynamic travel update comprises the obtained at least one element and a predicted missing element having a highest confidence score.

Another aspect of the invention provides an apparatus, comprising: at least one processor; and a computer readable storage medium having computer readable program code embodied therewith and executable by the at least one processor, the computer readable program code comprising: computer readable program code that obtains a user's status update posted on a social networking site; computer readable program code that analyzes the status update to obtain at least one element of travel information of a travel plan included within the status update, wherein the travel information comprises the elements of: a starting location, an ending location, and a mode of transportation; computer readable program code that predicts elements missing from the travel information, the missing elements comprising travel information not included in the status update, wherein the predicting comprises analyzing a secondary information source for the missing elements and wherein the predicting comprises assigning a confidence score to the prediction; and computer readable program code that provides a dynamic travel update identifying travel progress of the user, compared to the travel plan based upon the obtained at least one element and the predicted missing elements, wherein the dynamic travel update comprises the obtained at least one element and a predicted missing element having a highest confidence score.

An additional aspect of the invention provides a computer program product, comprising: a computer readable storage medium having computer readable program code embodied therewith, the computer readable program code comprising: computer readable program code that obtains a user's status update posted on a social networking site; computer readable program code that analyzes the status update to obtain at least one element of travel information of a travel plan included within the status update, wherein the travel information comprises the elements of: a starting location, an ending location, and a mode of transportation; computer readable program code that predicts elements missing from the travel information, the missing elements comprising travel information not included in the status update, wherein the predicting comprises analyzing a secondary information source for the missing elements and wherein the predicting comprises assigning a confidence score to the prediction; and computer readable program code that provides a dynamic travel update identifying travel progress of the user, compared to the travel plan based upon the obtained at least one element and the predicted missing elements, wherein the dynamic travel update comprises the obtained at least one element and a predicted missing element having a highest confidence score.

A further aspect of the invention provides a method, comprising: obtaining a user's dynamic status update posted on a social networking site; identifying that the dynamic status update is a travel related status update and capturing at least one element of travel information included in the status update, wherein the at least one element of travel information comprises a starting location element, a destination location element, and a mode of transportation element; determining that at least one element is missing from the travel related status update; predicting the missing at least one element by accessing a secondary information source and capturing information contained within the secondary information source related to the status update that corresponds to the missing at least one element; and providing a travel status update comprising travel completion, based upon the at least one element captured from the status update and the predicted missing at least one element.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
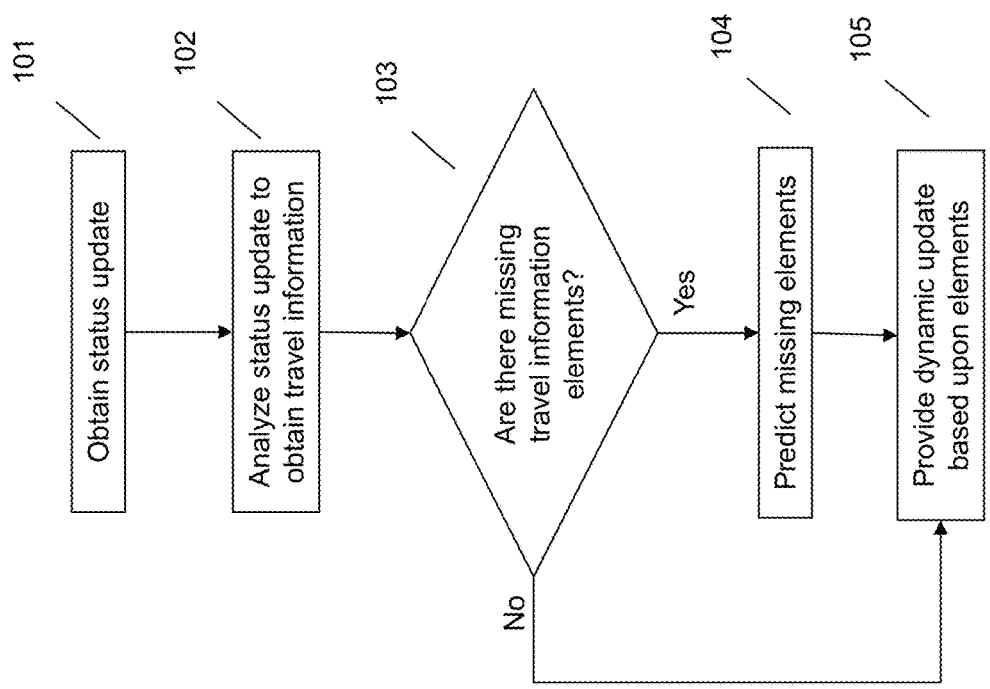
FIG. 1 illustrates a method of providing a dynamic status update for an offline user.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
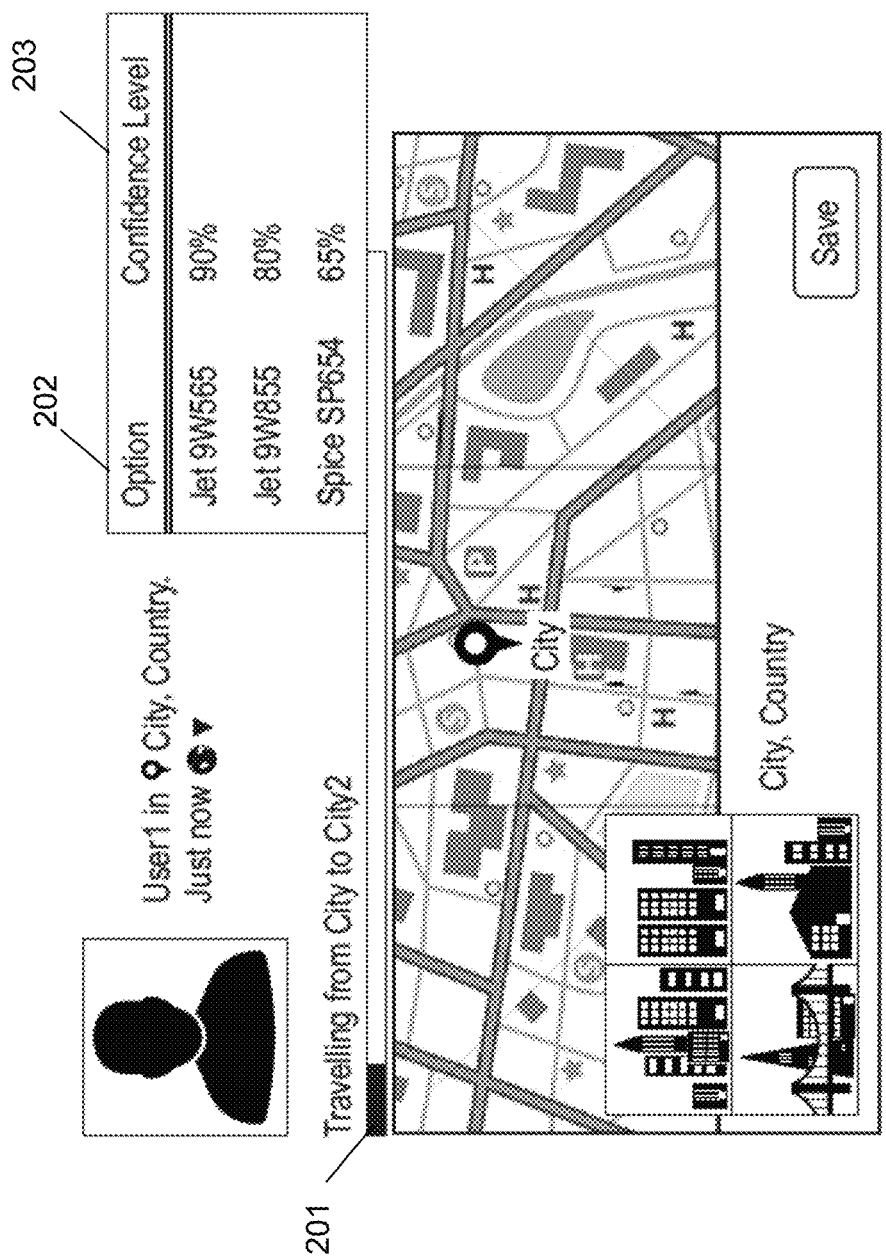
FIG. 2 illustrates an example display having a dynamic status update for an offline user.
Figure 3:
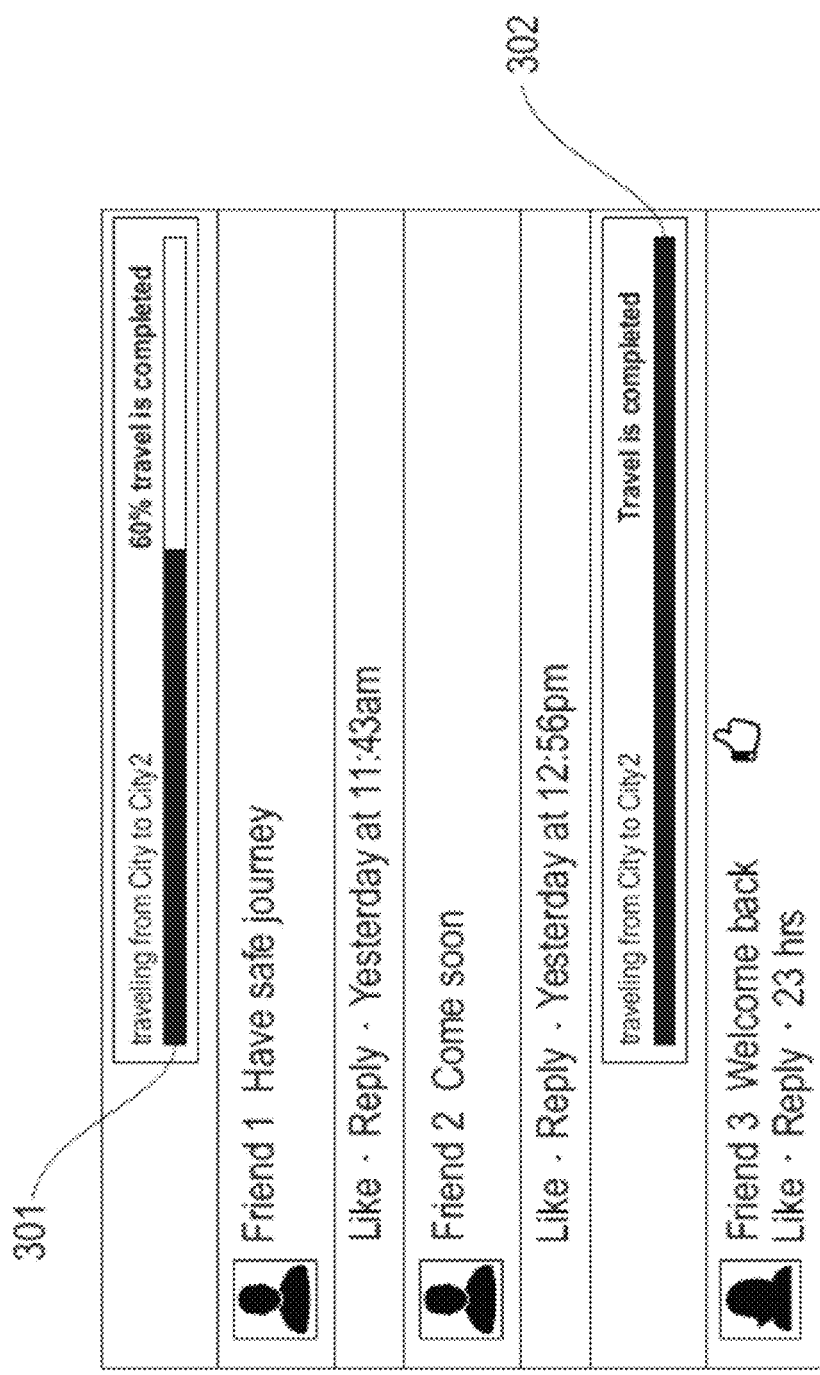
FIG. 3 illustrates an example display of grouping comments based upon a dynamic status update for an offline user.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Dynamic status updates may be related to actions of a user where the user is performing an action or steps of an action over a length of time. For example, the status update may be related to a user traveling, for example, driving to work from home. The user may create the status update when he or she leaves home. Since the status update is regarding the user driving to work, the status could be updated as the user travels along his or her route to work, for example, by showing the user's progress during the trip. Some social networking sites track the user's movements and locations and are able to update the status with the progress of the user. Such updates allow other users to determine where the user is located along the travel path. For example, if a parent is expecting a child to come home after school, the parent can track the child's progress as the child travels from school to home. To dynamically update the status of the user, the user must have a device which can provide the location of the device to the social networking site. For example, the device may have a global positioning system, network triangulation system, and the like. The social networking site can then use the position information provided by the device to update the status of the user.

The problem with such an approach is that to update the status based upon the location of the device, the device needs to be connected to a network which allows communication with the Internet (i.e., "online") to allow communication with the social networking site. However, the user's device may not always be connected to such a network. For example, the device may not have power (e.g., the battery died, the device is powered off, etc.), the device may not have access to a telecommunications network (e.g., the device is not within network service range, the device may not be able to communicate with a network, the user's telecommunications service may not allow access to the Internet, etc.), access to the Internet access may require a large drain on the battery so the user may prevent access to the network, and the like. If the device does not have access to or cannot communicate with such a network, the device cannot provide location or position information. Therefore, the social networking site cannot be updated based upon position information provided by the device.

Accordingly, an embodiment provides a method of providing a dynamic status update for a user who is not connected to a network or the Internet (i.e., "offline"). An embodiment may obtain a social networking site status update of a user. Upon determining that the status update is related to a dynamic event, an embodiment may analyze the status update to obtain elements of travel information of a travel plan (e.g., traveling from work to home, traveling to another country, etc.). Elements of travel information may include a starting location, destination location, mode of transportation (e.g., plane, flight number, car, bus, bus service provider, etc.), and the like.

If an embodiment identifies that any travel elements are missing, an embodiment may predict the missing travel elements. For example, an embodiment may identify that the status update includes the destination location, but not the starting location or the mode of transportation. To predict these elements, an embodiment may access a secondary information source that may have information related to the travel plan of the user. For example, an embodiment may access messaging history of the user, where the user may have discussed his or her travel plans with another user. As another example, an embodiment may have access to a user's email and identify an email message that has flight confirmation information related to the travel plan. Using the information obtained from the secondary information sources, an embodiment may predict which travel elements should be associated with the known travel elements that were obtained from the status update.

In predicting the elements an embodiment may identify multiple possible options for the desired travel element. Therefore, an embodiment may assign a confidence score to each of the possible options that have been identified as options for fulfilling the missing travel element. An embodiment may then provide a dynamic travel update identifying the travel progress of the user along the travel plan. The dynamic travel update may include the travel elements obtained from the status update and may additionally include the predicted travel elements. If more than one possibility was identified for the missing travel elements, the dynamic update may include the travel element with the highest confidence score.

Such a system provides a technical improvement over current systems for providing dynamic status updates on social networking sites in that the system is able to provide a dynamic update even when a device of the user is not connected to a network or the Internet. As an example, if a user is traveling on an airplane, the device has to be powered off or disconnected from the network and, therefore, cannot provide positioning updates to a social networking site. An embodiment is able to predict the user's location based upon travel elements contained within a status update and predicted travel elements obtained from secondary information sources and correlate the travel information with a live information source. Accordingly, the social networking site does not need exact positioning information from a user's device to be able to provide a dynamic status update.

For clarity of understanding, embodiments are described in connection with status updates related to a user traveling. However, it should be understood that the embodiments as described herein can be applied to other status updates related to dynamic events. For example, embodiments as described herein can be applied to status updates related to a user attending an event (e.g., concert, sporting event, fundraiser, etc.), competing in an event (e.g., marathon, a timed event, etc.), and the like.

Referring now to FIG. 1, at 101 an embodiment may obtain a social networking site status update of a user. In obtaining the status update, an embodiment may access the social networking site and capture the status update. For example, an embodiment may be provided as a plug-in application to the social networking site and may access the status updates of the user. Alternatively, the social networking site status update may be provided to an embodiment. For example, when a user makes a social media post, the post may also be provided to an embodiment. An embodiment may analyze the status update to identify whether the status update is related to a static or dynamic event. If the status update is related to a dynamic event, an embodiment may additionally determine the event or topic (e.g., traveling, attending an event, etc.) of the status update. To determine if the status update is dynamic or static and the type of event, classifiers can be trained to detect these types of status updates or posts.

If an embodiment determines that the status update is a dynamic post related to travel, or another type of event as described above, an embodiment may provide a prompt or notification to the user. This prompt may ask the user if he or she would like the status update to be automatically updated. If the user indicates that the post should be dynamically updated, an embodiment may proceed to update the status update as described in more detail below. The prompt may be provided for every identified dynamic status update. Alternatively, a user may be able to set a preference that the system completes the same action (e.g., always automatically updates, automatically updates for certain types of posts, never automatically updates, only requests user input once a day, etc.) every time a dynamic post is identified. For example, a user may set a preference that the user is only prompted the first time that the user logs into the social networking site during the day. As another example, a user may set a preference that dynamic posts related to travel are always automatically updated, but other dynamic posts require user permission.

If a user has provided permission to update the status update automatically, at 102 an embodiment may analyze the status update to obtain at least one element of travel information of a travel plan that may be included in the status update. The travel plan may include the entire travel path (e.g., going from one location to another location). To analyze the status update, an embodiment may parse the text of the status update to identify information contained within the status update. In order to update the travel status update, the travel elements may include a starting location, a destination location, and mode of transportation. The mode of transportation may include a type of transportation (e.g., car, bicycle, airplane, bus, train, etc.) and information related to the type of transportation (e.g., flight number, bus route, travel path, etc.). The travel elements may include additional information, for example, when the traveling is to occur, when the destination is expected to be reached, and the like. For example, a user may provide a status update that states "John is traveling to Italy." An embodiment may identify that "Italy" is the destination location.

At 103, an embodiment may identify whether any elements of the travel information are missing. Using the example above regarding John traveling to Italy, an embodiment may identify that the starting location and mode of transportation are missing. An embodiment may additionally identify that a more specific destination location is missing (e.g., the city, hotel, region, etc.). If elements of the travel information are missing, an embodiment may predict the missing elements at 104. To make these predictions an embodiment may access a secondary information source. A secondary information source may include a secondary source within the social networking site (e.g., messaging history, other user's status updates, etc.), a secondary source of the user (e.g., email account, a communication account, a history associated with the user, etc.), and the like. As an example, an embodiment may analyze the status updates associated with friends of the user. As another example, an embodiment may access notification messages within the user's email account.

When accessing these secondary information sources, an embodiment may identify information that may be related to the travel plan of the status update. For example, if a user has posted "Going with Bob to Canada," an embodiment may access Bob's status updates to identify whether Bob has provided more details about the trip. Thus, if an embodiment identifies that Bob has a status update that says "Flying to Canada," an embodiment may predict that the mode of transportation of the user may be an airplane flight. An embodiment may then access a website having flights to Canada to determine which flights are going to Canada and when. Similarly, an embodiment may obtain notification messages (e.g., email, text message, etc.) that are confirmations of the travel plans of the user. For example, if a user books a hotel, the hotel may send a confirmation email to the user, which may be used by an embodiment to predict the missing travel elements.

Other secondary sources may be used. For example, an embodiment may access the messaging service of the social networking site to identify if the user has communicated with friends regarding the travel plans. As another example, an embodiment may identify past choices of the user to help predict the missing elements. For example, if a user's status update states "Going to work," an embodiment may identify a previously used route or a previous status update having more details to help predict missing elements. One embodiment may use the user's network activities to assist in predicting missing elements. For example, if a user selects an advertisement for a hotel within the social networking site, an embodiment may identify the location of this hotel and use this information to assist in predicting the missing elements.

An embodiment may predict different possible options for missing elements. For example, based on an email confirmation, an embodiment may identify that the destination city could be Venice. However, based on status updates of other users, an embodiment may identify that the destination city could be Florence. Accordingly, an embodiment may assign a confidence score to any of the predicted elements. The assignment of a confidence score may not be dependent on identifying multiple possible options. In other words, even if only a single possibility has been identified for a missing element, a confidence score may be assigned to that possibility. The confidence score may indicate how likely that possibility is the correct missing element. The confidence score can be increased or decreased over time. For example, an embodiment may request user feedback on whether a possibility is the correct missing element. Thus, the confidence score could be partially based on direct user feedback. As another example, a user may post a first status update stating "Going to work." An embodiment may then predict missing elements. Later, the user may post an update stating "On the bus to work." Based upon this second status update, an embodiment may adjust the confidence scores of the predicted missing elements.

Once the missing elements have been predicted at 104, or if no travel elements were missing at 103, an embodiment may provide a dynamic travel update which identifies the travel progress of the user as compared to the travel plan. The dynamic travel update may be provided on a social media networking site. A dynamic travel update may include a status bar that indicates the percentage of the trip completed, for example, as a progress bar that is iteratively updated as the user completes parts of the travel. As another example, the dynamic travel update may include a status update stating where the user is currently located. To identify the travel progress, an embodiment may correlate the obtained and predicted travel elements with live information sources related to the travel plan. As an example, if an embodiment has identified the travel plan as including a flight, an embodiment may obtain the flight status, for example, by querying an airline website, accessing a flight schedule, and the like, and determine where the flight is currently located. An embodiment can then use this information to update the user's progress. As another example of correlating live information, an embodiment may access traffic details from a live information source and then determine that if a user has taken a particular route, where on the route the user is likely located.

In one embodiment, the dynamic travel update may be iteratively updated as the user progresses along the travel plan. This iterative update may include updating the status at a predetermined time frame (e.g., every 10 minutes, every hour, etc.), at predetermined locations (e.g., way points, major cities, connection cities, etc.), and the like. For example, the iterative updating may include showing progress of the user, for example, using a progress bar. As the user completes different percentages of the travel, the progress bar may be updated to show this new progress. The updating may be based upon a user preference. For example, the user may set the travel update to be updated when the user gets to a particular location or when the user has been stopped for a predetermined amount of time.

The dynamic travel update may be based upon the travel elements that were obtained from the status update and additionally based upon the predicted travel elements. An embodiment may provide a dynamic update including the predicted missing element having the highest confidence score. Alternatively, as shown in FIG. 2, an embodiment may provide a dynamic update 201 having multiple options 202 based upon the possible options that were previously predicted. These multiple options 202 may additionally provide the confidence score 203 associated with each option. FIG. 2, shows an embodiment in which the mode of transportation was the missing element. It should be understood that similar dynamic status updates can be generated with different or multiple missing elements.

As the system updates the status dynamically, for example, on a social networking site, an embodiment may also track comments and "likes" respective to the status update. For example, if two "friends" provide comments when the status is at 60% complete, an embodiment will group the comments by the progress status. The user can then select the status update (e.g., by hovering, selecting, opening the status update, etc.), which may cause an embodiment to display which "friends" provided comments at which progress completion status. Alternatively, the status progress update may be included in the comments. For example, referring to FIG. 3, the status update that was visible when the "friend" provided the comment is shown in the comment box. For example, 301 shows the status update of 60% travel complete, when Friend 1 and Friend 2 provided the comment. 302 shows the status update of travel being completed when Friend 3 provided the comment. If more than one "friend" comments at the same travel progress status, the comments may be grouped under a single progress status update, as shown in FIG. 3, or each comment may include the travel progress status update.

Figure 4:
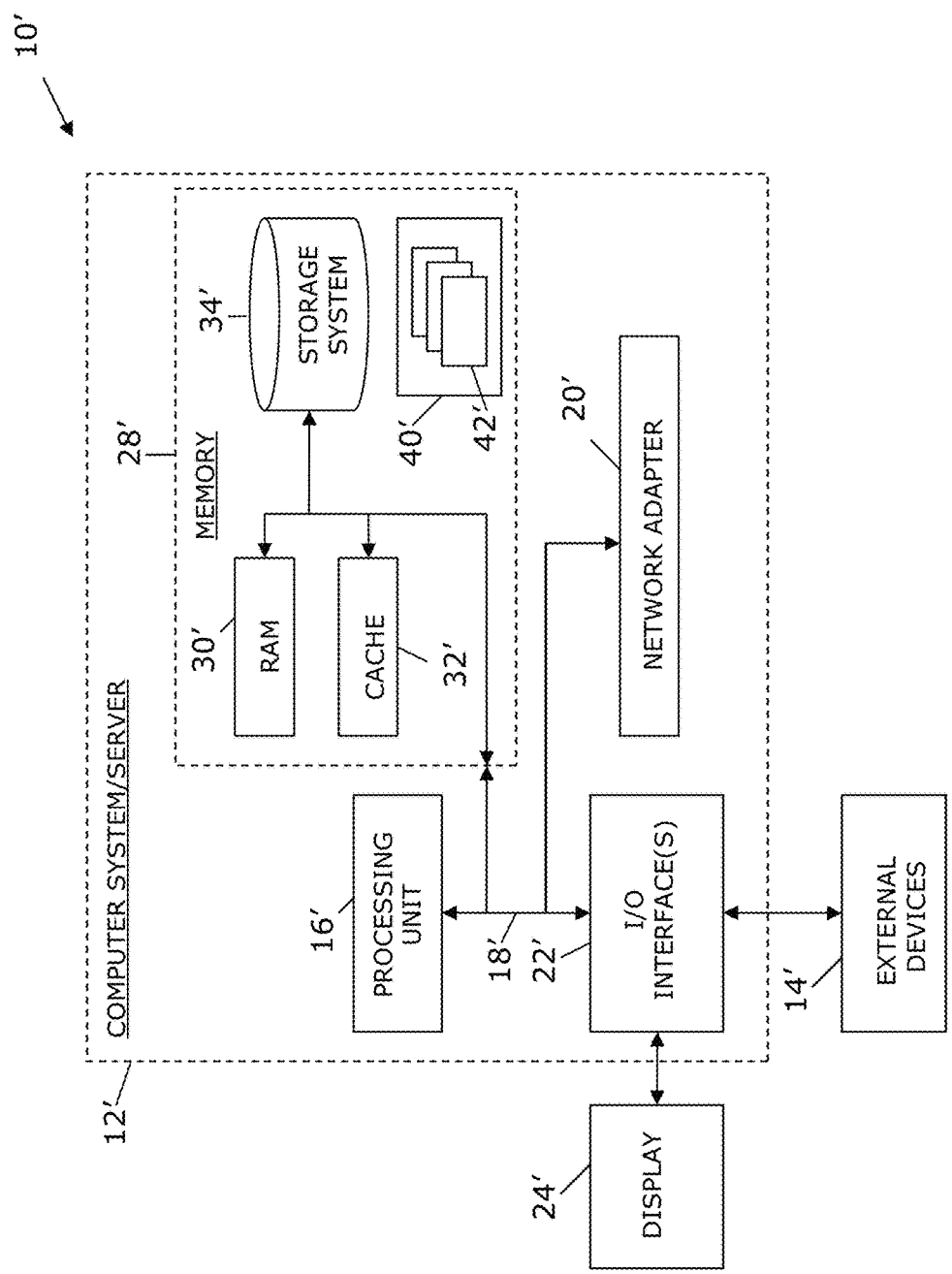
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/ server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
obtaining a user's status update posted on a social networking site;
analyzing the status update to obtain at least one element of travel information of a travel plan included within the status update, wherein the travel information comprises the elements of: a starting location, an ending location, and a mode of transportation;
predicting, while the user is offline, elements missing from the travel information, the missing elements comprising travel information not included in the status update, wherein the predicting comprises analyzing a secondary information source having information related to the travel plan for the missing elements and wherein the predicting comprises assigning a confidence score to the prediction, wherein the analyzing the secondary information source comprises identifying an information source other than the social networking site having information related to the travel plan, accessing the information source, and identifying information included in the information source that is related to the travel plan; and
providing, on the social networking site and while the user is offline, a dynamic travel update identifying travel progress of the user, compared to the travel plan, wherein the dynamic travel update is based upon the obtained at least one element and a predicted missing element having a highest confidence score.

2. The method of claim 1, wherein the predicting comprises identifying a plurality of possible options for the missing elements.

3. The method of claim 2, comprising assigning a confidence score to each of the plurality of possible options.

4. The method of claim 3, comprising:
providing a dynamic travel update based upon each of the plurality of possible options; and
providing the confidence score for each of the plurality of possible options.

5. The method of claim 1, comprising iteratively updating the travel update based upon the travel progress.

6. The method of claim 1, wherein the providing a dynamic travel update comprises correlating the obtained and predicted elements with a live information source related to the travel plan.

7. The method of claim 1, wherein the analyzing a secondary information source comprises accessing a communication account of the user and identifying a communication related to the travel plan.

8. The method of claim 1, wherein the analyzing a secondary information source comprises identifying at least one other user having a similar social networking status update and obtaining missing elements from the similar social networking status update.

9. The method of claim 1, wherein the analyzing a secondary information source comprises identifying user history having at least one characteristic related to the travel plan.

10. The method of claim 1, wherein the providing a dynamic travel update comprises providing travel progress based upon a previously selected user preference.

11. An apparatus, comprising:
at least one processor; and
a computer readable storage medium having computer readable program code embodied therewith and executable by the at least one processor, the computer readable program code comprising:
computer readable program code that obtains a user's status update posted on a social networking site;
computer readable program code that analyzes the status update to obtain at least one element of travel information of a travel plan included within the status update, wherein the travel information comprises the elements of: a starting location, an ending location, and a mode of transportation;

computer readable program code that predicts, while the user is offline, elements missing from the travel information, the missing elements comprising travel information not included in the status update, wherein the predicting comprises analyzing a secondary information source having information related to the travel plan for the missing elements and wherein the predicting comprises assigning a confidence score to the prediction, wherein the analyzing the secondary information source comprises identifying an information source other than the social networking site having information related to the travel plan, accessing the information source, and identifying information included in the information source that is related to the travel plan; and computer readable program code that provides, on the social networking site and while the user is offline, a dynamic travel update identifying travel progress of the user, compared to the travel plan, wherein the dynamic travel update is based upon the obtained at least one element and a predicted missing element having a highest confidence score.

12. A computer program product, comprising:

a computer readable storage medium having computer readable program code embodied therewith, the computer readable program code comprising:

computer readable program code that obtains a user's status update posted on a social networking site;

computer readable program code that analyzes the status update to obtain at least one element of travel information of a travel plan included within the status update, wherein the travel information comprises the elements of: a starting location, an ending location, and a mode of transportation;

computer readable program code that predicts, while the user is offline, elements missing from the travel information, the missing elements comprising travel information not included in the status update, wherein the predicting comprises analyzing a secondary information source having information related to the travel plan for the missing elements and wherein the predicting comprises assigning a confidence score to the prediction, wherein the analyzing the secondary information source comprises identifying an information source other than the social networking site having information related to the travel plan, accessing the information source, and identifying information included in the information source that is related to the travel plan; and computer readable program code that provides, on the social networking site and while the user is offline, a dynamic travel update identifying travel progress of the user, compared to the travel plan, wherein the dynamic travel update is based upon the obtained at least one element and a predicted missing element having a highest confidence score.

13. The computer program product of claim 12, wherein the predicting comprises identifying a plurality of possible options for the missing elements.

14. The computer program product of claim 13, comprising computer readable program code that assigns a confidence score to each of the plurality of possible options.

15. The computer program product of claim 14, comprising:

providing a dynamic travel update based upon each of the plurality of possible options; and providing the confidence score for each of the plurality of possible options.

16. The computer program product of claim 12, comprising correlating the obtained and predicted elements with a live information source related to the travel plan.

17. The computer program product of claim 12, wherein the analyzing a secondary information source comprises accessing a communication account of the user and identifying a communication related to the travel plan.

18. The computer program product of claim 12, wherein the analyzing a secondary information source comprises identifying at least one other user having a similar social networking status update and obtaining missing elements from the similar social networking status update.

19. The computer program product of claim 12, wherein the analyzing a secondary information source comprises identifying user history having at least one characteristic related to the travel plan.

20. A method, comprising:

obtaining a user's dynamic status update posted on a social networking site;

identifying that the dynamic status update is a travel related status update and capturing at least one element of travel information included in the status update, wherein the at least one element of travel information comprises a starting location element, a destination location element, and a mode of transportation element;

determining that at least one element is missing from the travel related status update;

predicting, while the user is offline, the missing at least one element by accessing a secondary information source having information related to the travel plan and capturing information contained within the secondary information source related to the status update that corresponds to the missing at least one element, wherein the capturing information comprises identifying an information source other than the social networking site having information related to the travel plan, accessing the information source, and identifying information included in the information source that is related to the travel plan; and providing, on the social networking site and while the user is offline, a travel status update comprising travel completion, wherein the travel status update is based upon the at least one element captured from the status update and the predicted missing at least one element.

* * * * *